(12) United States Patent
Chen et al.

(10) Patent No.: US 7,486,725 B2
(45) Date of Patent: Feb. 3, 2009

(54) BIT ERROR RATE TESTER AND PSEUDO RANDOM BIT SEQUENCES GENERATOR THEREOF

(75) Inventors: Wei-Zen Chen, Douliou (TW); Guan-Sheng Huang, Dashu Township, Kaohsiung County (TW)

(73) Assignee: National Chiao Tung University, Hsinchu (TW)

( * ) Notice: Subject to any disclaimer, the term of this patent is extended or adjusted under 35 U.S.C. 154(b) by 633 days.

(21) Appl. No.: 11/077,756

(22) Filed: Mar. 9, 2005

(65) Prior Publication Data

US 2006/0133468 A1    Jun. 22, 2006

(30) Foreign Application Priority Data

Dec. 17, 2004    (TW) .............................. 93139316 A

(51) Int. Cl.
*H04B 3/46* (2006.01)
*H04B 17/00* (2006.01)
*H04Q 1/20* (2006.01)

(52) U.S. Cl. .................... 375/224; 714/724; 714/739

(58) Field of Classification Search .................... 714/30, 714/48, 100, 1, 25, 27, 699, 704–705, 724, 714/733–734, 738–739, 735; 375/244–245, 375/288, 224–228

See application file for complete search history.

(56) References Cited

U.S. PATENT DOCUMENTS

| 5,825,824 | A  | * | 10/1998 | Lee et al. ................... 375/292 |
| 6,597,735 | B1 | * | 7/2003  | Baba ........................ 375/238 |
| 7,305,025 | B2 | * | 12/2007 | Yamaguchi et al. ......... 375/226 |
| 2004/0153913 | A1 | * | 8/2004 | Fishman et al. ............ 714/724 |
| 2005/0071399 | A1 | * | 3/2005 | Bonaccio et al. ........... 708/250 |

OTHER PUBLICATIONS

Malasani, Rammohan. "A SiGe 10-Gb/s Multi-Pattern Bit Error Rate Tester," IEEE Radio Frequency Integrated Circuits Symposium, pp. 321-324, Jun. 2003.*

* cited by examiner

*Primary Examiner*—Shuwang Liu
*Assistant Examiner*—James M Perez
(74) *Attorney, Agent, or Firm*—J.C. Patents

(57) ABSTRACT

A bit error rate tester and a pseudo random bit sequences (PRBS) generator thereof are provided. The bit error rate tester includes a transmitter PRBS generator, a master PRBS generator, a slave PRBS generator, a comparator, and a counting unit. The transmitter PRBS generator generates a parallel N-bit (N is an integer larger than 1) original PRBS, wherein an object to be tested receives the original PRBS and outputs a parallel N-bit code to be tested. The master and the slave PRBS generators generate a master and a slave parallel N-bit PRBS, respectively. The comparator receives, compares, and determines whether the code to be tested, the master and the slave PRBS are the same or not, and outputs a comparison result. The counting unit coupling to the comparator counts a number of bit errors based on the comparison result.

15 Claims, 13 Drawing Sheets

BIT ERROR RATE TESTER AND PSEUDO RANDOM BIT SEQUENCES GENERATOR THEREOF

CROSS-REFERENCE TO RELATED APPLICATION

This application claims the priority benefit of Taiwan application serial no. 93139316, filed on Dec. 17, 2004.

BACKGROUND OF THE INVENTION

1. Field of the Invention

The present invention relates to a bit error rate tester and a pseudo random bit sequences generator thereof, and more particularly, to a parallel bit error rate tester and a parallel pseudo random bit sequences generator thereof.

2. Description of the Related Art

A pseudo random bit sequences (PRBS) generator is commonly used in a data transceiver as a source for testing input signals. FIG. 1 schematically shows a conventional data transmitting and receiving system having a serial bit error rate tester. When a transmitter 110 intends to transmit data to a receiver 120 via a transmission media 130 (e.g. a cable), a master system 111 in the transmitter 110 provides a parallel data to a serializer 112. The serializer 112 converts the parallel data to a serial data, then a driver 115 transmits the serial data to an input-buffer 125 in the receiver 120 via the transmission media 130. A deserializer 122 converts the serial data, which is output from the transmitter 110 and has passed through the transmission media 130 and the input-buffer 125, to a parallel data, such that the serial data is further transmitted to a master system 121 in the receiver 120.

Conventionally, when measuring the bit error rate between the transmitter 110 and the receiver 120, a bit error rate tester 113 in the transmitter 110 generates a serial pseudo random bit sequences Dout, then a multiplexer 114 selectively transmits the pseudo random bit sequences Dout to the driver 115, and the driver 115 transmits the serial pseudo random bit sequences to the input-buffer 125 in the receiver 120 via the transmission media 130. Meanwhile, a demultiplexer 124 selectively transmits the received pseudo random bit sequences to a bit error rate tester 123. The bit error rate tester 123 counts the number of error bits on the received pseudo random bit sequences, such that the bit error rate is obtained.

In general, each of the bit error rate testers 113 and 123 comprises a serial pseudo random bit sequences generator for generating same pseudo random bit sequences. FIG. 2 schematically shows a conventional serial pseudo random bit sequences generator. The serial pseudo random bit sequences generator comprises a plurality of registers 210-1~210-15 and an XOR gate 220. When a clock starts, each output of the registers 210-1~210-15 is transmitted to the next register, the XOR gate 220 performs an operation on an output of the register 210-14 and an output of the register 210-15, and the operation result is fed back to the input of the first register 210-1. If not all initial values of the registers are 0, by repeatedly performing such operation, all combination signals except the one equals to all 0 should be generated, and the output data Dout is commonly used as the generated pseudo random bit sequences.

In order to improve the applications of the pseudo random bit sequences generator and to increase its testability, a programmable pseudo random bit sequences generator is necessary. FIG. 3 schematically shows a conventional programmable pseudo random bit sequences generator configuration. As shown in the diagram, a plurality of serial registers 310-1~310-31 sequentially transmits the pseudo random bit sequences Dout stage by stage based on the clock signal, and the XOR gate performs a different algorithm operation on the outputs of part of the registers 310-1~310-31, and the operation result is fed back to a multiplexer 330, such that a plurality of feedback paths is formed. The multiplexer 330 selects the feedback path representing different algorithm as the active feedback path based on a selection signal SEL, so as to modify the pattern length of the output pseudo random bit sequences.

However, under extremely high speed application conditions, the bit rate of the conventional serial pseudo random bit sequences generator is restrained by the speed of the digital circuits and the registers. Besides, due to the registers are operated in an utmost speed, a great amount of power consumption is inevitable. In addition, a conventional data transmission system is typically configured as multi-bit parallel input, serial transmission, and multi-bit serial output, the conventional serial bit error rate tester is not able to fully test each component in the entire transmission testing system (for example, the serializer 112 and the deserializer 122 of FIG. 1 are not testable).

SUMMARY OF THE INVENTION

Therefore, it is an object of the present invention to provide a bit error rate tester having adjustable pattern length, adjustable mark density, and a self error correction function, so as to improve the circuit testing reliability and the correctness of circuit testing measurement result.

It is another object of the present invention to provide a parallel pseudo random bit sequences (PRBS) generator having adjustable pattern length and adjustable mark density for quickly generating a parallel pseudo random bit sequences.

It is another object of the present invention to provide a bit error rate tester for counting a number of bit errors for an object to be tested. The bit error rate tester includes a transmitter pseudo random bit sequences generator, a master pseudo random bit sequences generator, a slave pseudo random bit sequences generator, a comparator, and a counting unit. The transmitter pseudo random bit sequences generator generates a parallel N-bit (N is an integer larger than 1) original pseudo random bit sequences, wherein the object to be tested receives the original pseudo random bit sequences and generates a parallel N-bit code to be tested. The master and the slave pseudo random bit sequences generators generate a master and a slave parallel N-bit pseudo random bit sequences, respectively. The comparator receives, compares, and determines whether the code to be tested, the master and the slave pseudo random bit sequences are the same or not, and generates a comparison result. The counting unit coupling to the comparator counts a number of bit errors based on the comparison result.

In accordance with the bit error rate tester provided by a preferred embodiment of the present invention, the counting unit mentioned above compares the number of bit errors based on the comparison result, so as to calculate the bit error rate of the object to be tested from the number of comparisons and the number of bit errors. According to the preferred embodiment of the present invention, the object to be tested is a data transmission system.

In accordance with the bit error rate tester provided by the preferred embodiment of the present invention, the slave pseudo random bit sequences generator mentioned above receives the code to be tested, and generates the slave pseudo random bit sequences based on the current code to be test. Except receiving the code to be tested in order to generate master pseudo random bit sequences in a predetermined period, the master pseudo random bit sequences generator does not receive the code to be tested but automatically generates master pseudo random bit sequences.

In accordance with the bit error rate tester provided by the preferred embodiment of the present invention, the described counting unit comprises an encoder, an operating circuit and an accumulating circuit. The encoder receives a comparison result from the comparator, encodes the number of error bits of the current comparison to a plurality of numbers of error occurrences based on the comparison result, and the numbers of error occurrences are further output. The operating circuit receives and summates each error occurrence, and outputs a number of current errors. The accumulating circuit sequentially receives and summates each number of current errors, and outputs the number of bit errors.

In accordance with the bit error rate tester provided by the preferred embodiment of the present invention, the mentioned operating circuit comprises plural first adders and a second adder. Wherein, each of the first adders receives and summates the corresponding number of error occurrences and outputs a medium error value, respectively. The second adder receives and summates all medium error values and outputs a number of current errors.

In accordance with the bit error rate tester provided by the preferred embodiment of the present invention, the mentioned accumulating circuit comprises an accumulator and a counter. Wherein, the accumulator summates a previous accumulation result to the number of current errors, and outputs a current accumulation result. The counter counts a number of overflow for the most significant bit of the current accumulation result output by the adder, and outputs a counting result, wherein a combination of the counting result and the accumulation result is the number of bit errors.

The present invention further provides a pseudo random bit sequences generator. The pseudo random bit sequences generator comprises a pseudo random bit sequences generating circuit and a mark density control circuit. The pseudo random bit sequences generating circuit generates a parallel (N+P−1)-bit source pseudo random bit sequences having a maximum pattern length of $2^{M-1}$, wherein N, M and P are integers greater than 1. The mark density control circuit receives the source pseudo random bit sequences and modifies the mark density of the source pseudo random bit sequences based on a mark density selection signal, and outputs a parallel N-bit pseudo random bit sequences having a minimum mark density of $\frac{1}{2}^P$.

In accordance with the pseudo random bit sequences generator according to the preferred embodiment of the present invention, the pseudo random bit sequences generating circuit mentioned above comprises a plurality of pre-counting circuits, at least a multiplexer, and at least a register. Each pre-counting circuit performs the logic operation based on the corresponding algorithm respectively so as to output an (N+P−1)-bit pre-counting result. The multiplexer selects and outputs one of the pre-counting results based on the pattern length selection signal. The register temporarily stores the output of the multiplexer based on a specific timing and outputs the source pseudo random bit sequences. Wherein, each of the operating circuits receives the source pseudo random bit sequences, performs the logic operation based on the corresponding algorithm, and outputs the corresponding pre-counting result, respectively.

In accordance with the pseudo random bit sequences generator according to the preferred embodiment of the present invention, if an $s^{th}$ stage multiplexer among the multiplexers is represented by $MUX_s$, and an $s^{th}$ stage register among the registers is represented by $REG_s$ (where s is an integer greater than 0 and less than or equal to $$\left\lceil \frac{M}{N} \right\rceil \right),$$

the input terminal of $REG_s$ is coupled to the output terminal of $MUX_s$, and the output terminal of $REG_s$ is coupled to one of the input terminals of $MUX_{s-1}$.

In accordance with the pseudo random bit sequences generator according to the preferred embodiment of the present invention, one of the algorithms mentioned above is $Y_x = Y_{x-7} \oplus Y_{x-6}$, where $Y_x$ represents an $x^{th}$ bit of the pseudo random bit sequences generated by the pseudo random bit sequences generating circuit, and x is an integer greater than 0.

In accordance with the pseudo random bit sequences generator according to the preferred embodiment of the present invention, the mark density control circuit mentioned above comprises N mark density controllers $MDC_n$. The mark density controllers $MDC_n$ receives the outputs $Z_n \sim Z_{n+P-1}$ from the pseudo random bit sequences generator, and controls and determines the mark density of the pseudo random bit sequences $D_n$ to be $\frac{1}{2} \sim \frac{1}{2}^P$ and outputs $D_n$. Wherein, $Z_n$ represents an output of the $n^{th}$ bit in the pseudo random bit sequences generator, $MDC_n$ represents the $n^{th}$ mark density controller, $D_n$ represents an output of the $n^{th}$ mark density controller, and n is an integer greater than 0 and less than or equal to N.

The present invention compares the pseudo random bit sequences generated by the master pseudo random bit sequences generator with the code of the object to be tested. The counting unit can immediately measure the bit error rate of the object to be tested. In order to prevent the master pseudo random bit sequences generator from outputting incorrect signal, the slave pseudo random bit sequences generated by the slave pseudo random bit sequences generator is compared with the code to be tested again, so as to determine whether the pseudo random bit sequences generated by the master pseudo random bit sequences generator is correct or not. Therefore, the correctness and reliability of the measurement result in circuit testing are improved because of proper and timely correction on the self-detected errors. Wherein, the transmitter pseudo random bit sequences generator, the master pseudo random bit sequences generator, and the slave pseudo random bit sequences generator all use a parallel pseudo random bit sequences generator having adjustable pattern length and adjustable mark density as a high speed programmable built-in testing platform. The present invention may be implemented with silicon knowledge intelligence to replace a costly external testing equipment.

BRIEF DESCRIPTION OF THE DRAWINGS

The accompanying drawings are included to provide a further understanding of the invention, and are incorporated in and constitute a part of this specification. The drawings illustrate embodiments of the invention, and together with the description, serve to explain the principles of the invention.

DESCRIPTION OF THE PREFERRED EMBODIMENTS

Figure 1:
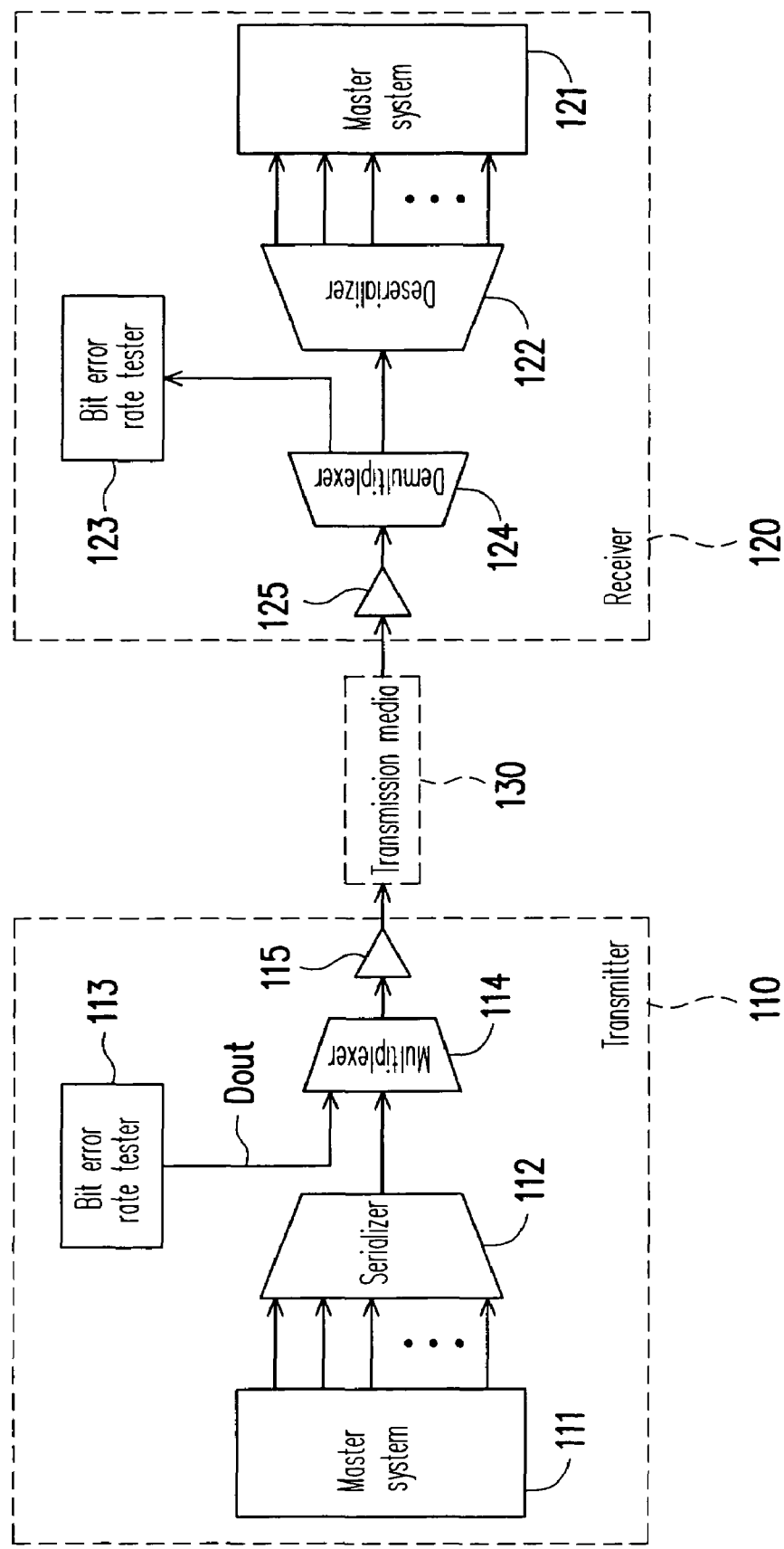
FIG. 1 schematically shows a conventional data transmitting and receiving system having a serial bit error rate tester.
Figure 4:
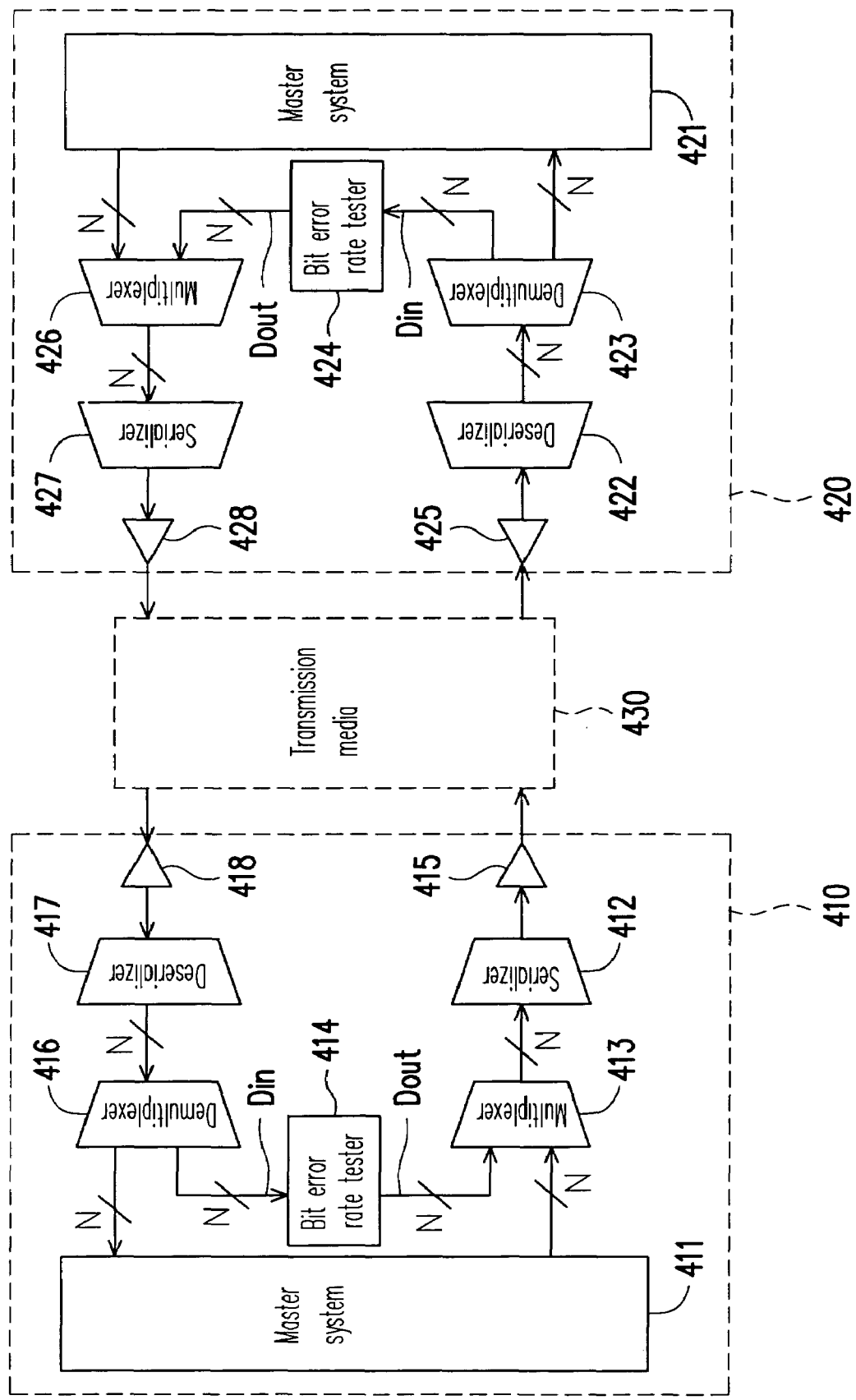
FIG. 4 schematically shows a data transmitting and receiving system having a parallel bit error rate tester according to a preferred embodiment of the present invention.

The conventional serial/de-serial transceiver is typically applied in the application of multi-bit parallel input, serial transmission, and multi-bit parallel output (as shown in FIG. 1), so as to facilitate the parallel pseudo random bit sequences generator in testing. FIG. 4 schematically shows a data transmitting and receiving system having a parallel bit error rate tester according to a preferred embodiment of the present invention. Referring to FIG. 4, when a transmitter 410 intends to transmit data to a receiver 420 via a transmission media 430 (e.g. a cable), a master system 411 in the transmitter 410 outputs a parallel N-bit data (where N is an integer greater than 1) to a serializer 412 via a multiplexer 413. The serializer 412 converts the parallel data to a serial data, and a buffer 415 transmits the serial data to a buffer 425 in the receiver 420 via the transmission media 430. A deserializer 422 transmits the serial data, which is output by the transmitter 410 and passed through the transmission media 430 and the buffer 425, to a parallel data, such that the parallel data is further transmitted to a master system 421 in the receiver 420 via a demultiplexer 423. Similarly, if the receiver 420 intends to send data back to the transmitter 410, the data is transmitted to a master system 411 through a multiplexer 426, a serializer 427, a buffer 428, the transmission media 430, a buffer 418, a deserializer 417, and a demultiplexer 416.

In order to fully measure a data transmitting and receiving system, a parallel bit error rate tester is deployed in the present embodiment. When it is intended to measure the bit error rate between the transmitter 410 and the receiver 420, a bit error rate tester 414 in the transmitter 410 generates a parallel N-bit pseudo random bit sequences Dout, and the multiplexer 413 selectively transmits the pseudo random bit sequences Dout to the serializer 412. The serializer 412 converts the parallel pseudo random bit sequences to a serial pseudo random bit sequences, and transmits the serial pseudo random bit sequences to the buffer 415. The buffer 415 transmits the serial pseudo random bit sequences to the buffer 425 in the receiver 420 via the transmission media 430. The deserializer 422 converts the serial pseudo random bit sequences output by the buffer 425 to a parallel N-bit pseudo random bit sequences, and the parallel pseudo random bit sequences is further transmitted to the demultiplexer 423. Meanwhile, the demultiplexer 423 selectively transmits the received parallel pseudo random bit sequences (i.e. the code to be tested) to the bit error rate tester 424, thus the bit error rate tester 424 checks the number of bit errors of the received code to be tested, such that the bit error rate is further obtained.

Figure 5:
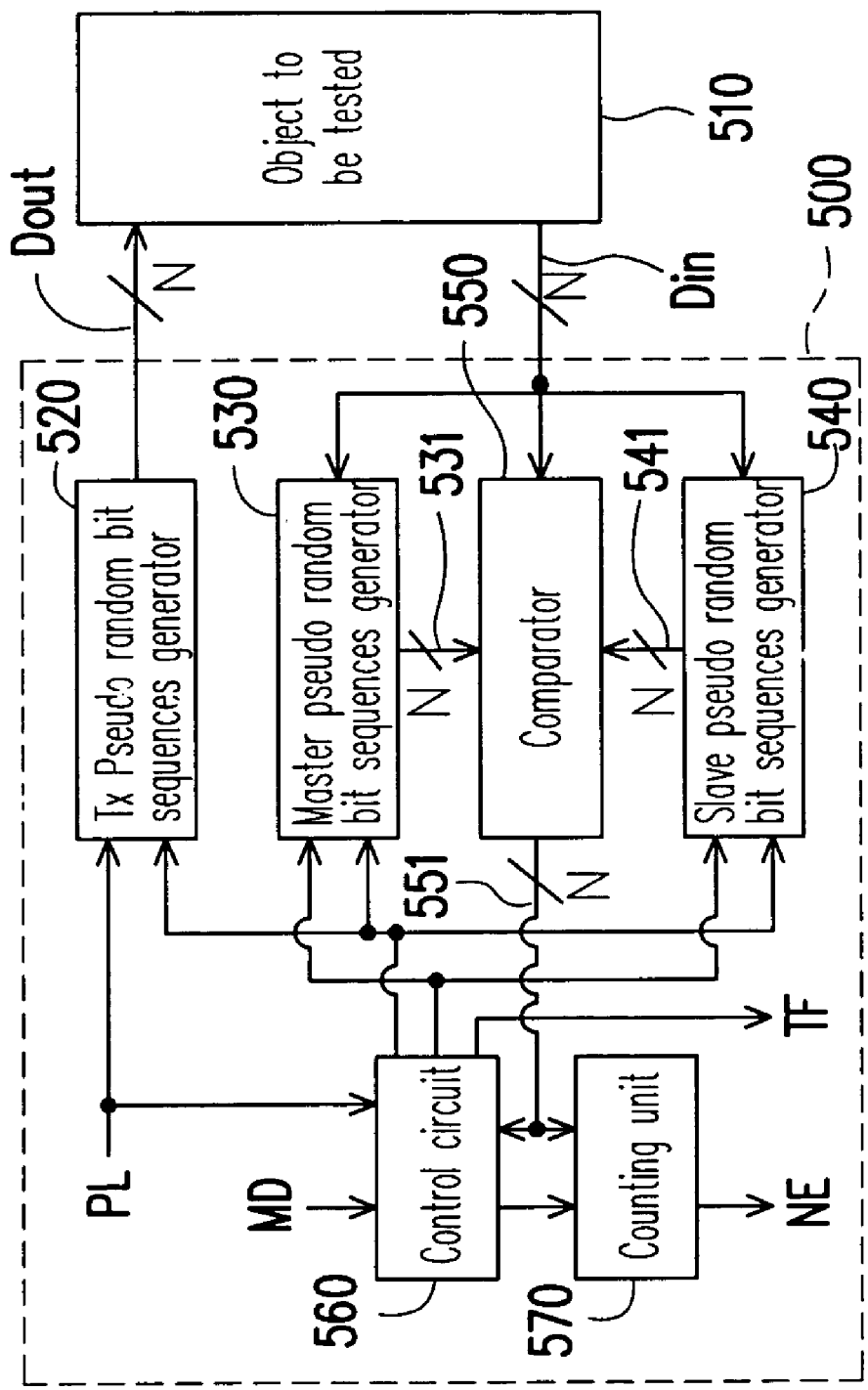
FIG. 5 schematically shows a block diagram of a parallel bit error rate tester according to the preferred embodiment of the present invention.

In general, each of the bit error rate testers 414 and 424 comprises same parallel pseudo random bit sequences generators respectively for generating same pseudo random bit sequences. In the present embodiment, the bit error rate testers 414 and 424 may be implemented as shown in FIG. 5. FIG. 5 schematically shows a block diagram of a parallel bit error rate tester according to a preferred embodiment of the present invention. Referring to FIG. 5, the object to be tested 510 in the present embodiment may be a data transmission system in FIG. 4. If the bit error rate tester 500 is applied in the field of built-in self test (BIST), the object to be tested 510 may be a memory to be tested.

The bit error rate tester 500 mainly comprises a plurality of pseudo random bit sequences generators 520, 530, and 540 that each has multiple pattern lengths, a comparator 550, a counting unit 570, and a control circuit 560. Wherein, the pseudo random bit sequences generator 520 in the transmitter generates and provides a parallel N-bit original pseudo random bit sequences Dout (i.e. a test signal) to the object to be tested 510, and a signal is sent out after a parallel-to-serial conversion is performed on the object to be tested 510. A code to be tested Din (i.e. a signal to be tested) is generated after the signal is received by the receiver and the demultiplex operation is completed, and the code to be tested Din is transmitted to the master pseudo random bit sequences generator 530 and the slave pseudo random bit sequences generator 540 simultaneously. Then, a master pseudo random bit sequences 531 for next clock is calculated by the master pseudo random bit sequences generator 530, so the comparator 550 can compare and determine whether the master pseudo random bit sequences 531 is equal to the next record of the code to be tested Din output from the object to be tested. A comparison result 551 is sent to a digital control circuit 560 to determine whether the code to be tested Din output from the object to be tested 510 is detected by the master pseudo random bit sequences generator 530 or not. After the master pseudo random bit sequences generator 530 detects the code to be tested Din output from the object to be tested 510, the measurement of the error rate is started.

When the measurement of the error rate starts, the comparator 550 compares the master pseudo random bit sequences 531 output by the master pseudo random bit sequences generator 530 with the code to be tested Din output from the object to be tested 510. The counting value is incremented by 1 after each time of comparison, so as to count the amount of the measured data signals. When the master pseudo random bit sequences 531 output by the master pseudo random bit sequences generator 530 is equal to the code to be tested Din output from the object to be tested 510, the accumulated counting value of the counting unit 570 is added by 0. If they are not the same, two cases are possible: it may be either some error occurred in receiving the signal, or some error occurred in the master pseudo random bit sequences generator 530. In order to verify the situation, the comparator 550 compares the master pseudo random bit sequences 531 generated by the master pseudo random bit sequences generator 530, the slave pseudo random bit sequences 541 generated by the slave pseudo random bit sequences generator 540, and the code to be tested Din output from the object to be tested 510, and a comparison result 551 output by the comparator 550 is transmitted to a control circuit 560 for error verification.

If the master pseudo random bit sequences 531 generated by the master pseudo random bit sequences generator 530 is different from the code to be tested Din output from the object to be tested 510, but the slave pseudo random bit sequences 541 generated by the slave pseudo random bit sequences generator 540 is equal to the code to be tested Din output from the object to be tested 510, the error is occurred from the master pseudo random bit sequences generator 530. Thus, the counting unit 570 controlled by the control circuit 560 will not count this error, and will re-load the code to be tested Din into the master pseudo random bit sequences generator in order to generate a next record of pseudo random bit sequences for further comparison.

If the master pseudo random bit sequences 531 output by the master pseudo random bit sequences generator 530 is equal to the code to be tested Din output from the object to be tested 510, whether the code to be tested Din output from the object to be tested 510 is or not equal to the slave pseudo random bit sequences 541 output by the slave pseudo random bit sequences generator 540 will be ignored. If the master pseudo random bit sequences 531 output by the master pseudo random bit sequences generator 530 is different from the code to be tested Din output from the object to be tested 510, and the slave pseudo random bit sequences 541 output by the slave pseudo random bit sequences generator 540 is also different from the code to be tested Din output from the object to be tested 510, the counting unit 570 records the number of error bits between the master pseudo random bit sequences 531 and the code to be tested Din, and continuously performs the testing.

The implementation of the slave pseudo random bit sequences generator is described later. Since the random numbers generated by the slave pseudo random bit sequences generators 520, 530, and 540 are serial and linear, if currently the mark density is ½, an accurate calculation of the next input value can be obtained by loading the received data into the slave pseudo random bit sequences generator.

During the synchronization between the transmitter and the receiver, the control circuit 560 controls the master pseudo random bit sequences generator 530 to load the code to be tested Din in order to generate a next record of pseudo random bit sequences for further comparison. If after K times of comparison (e.g. K=3, and the real number of testing may be varied based on circuit requirements), the master pseudo random bit sequences 531 output by the master pseudo random bit sequences generator 530 is exactly equal to the code to be tested Din output from the object to be tested 510, the master pseudo random bit sequences generator 530 in the transmitter will enter into a state of auto-generation and will not receive the code to be tested Din any more. Meanwhile, the mark density can be set based on the testing requirement, and the counting unit 570 starts counting the number of bit errors (i.e. the number of erroneous bits) and the number of testing. If the number of output bits is N, and the pattern length of the pseudo random bit sequences is designed as $2^M-1$ bits, the minimum value of K mentioned above should be $$\left\lceil \frac{M}{N} \right\rceil.$$

After the synchronization between the transmitter and the receiver is completed, the process enters into a testing phase.

When the receiver has entered into the testing phase and is not able to synchronize with the transmitter after T clocks, it is determined that the error rate of the object to be tested 510 is too high, and a testing failure signal TF is displayed. Wherein, the value of T mentioned above can be set based on the required specification. For example, T=K×(maximum error rate of the object to be tested (Pmax))/(minimum measurable error rate (Pmin)). Thus, the capacity of counter for counting errors (E)=Pmax/Pmin, and the capacity of counter for counting testing samples (C)=1/(Pmin×N).

Figure 6:
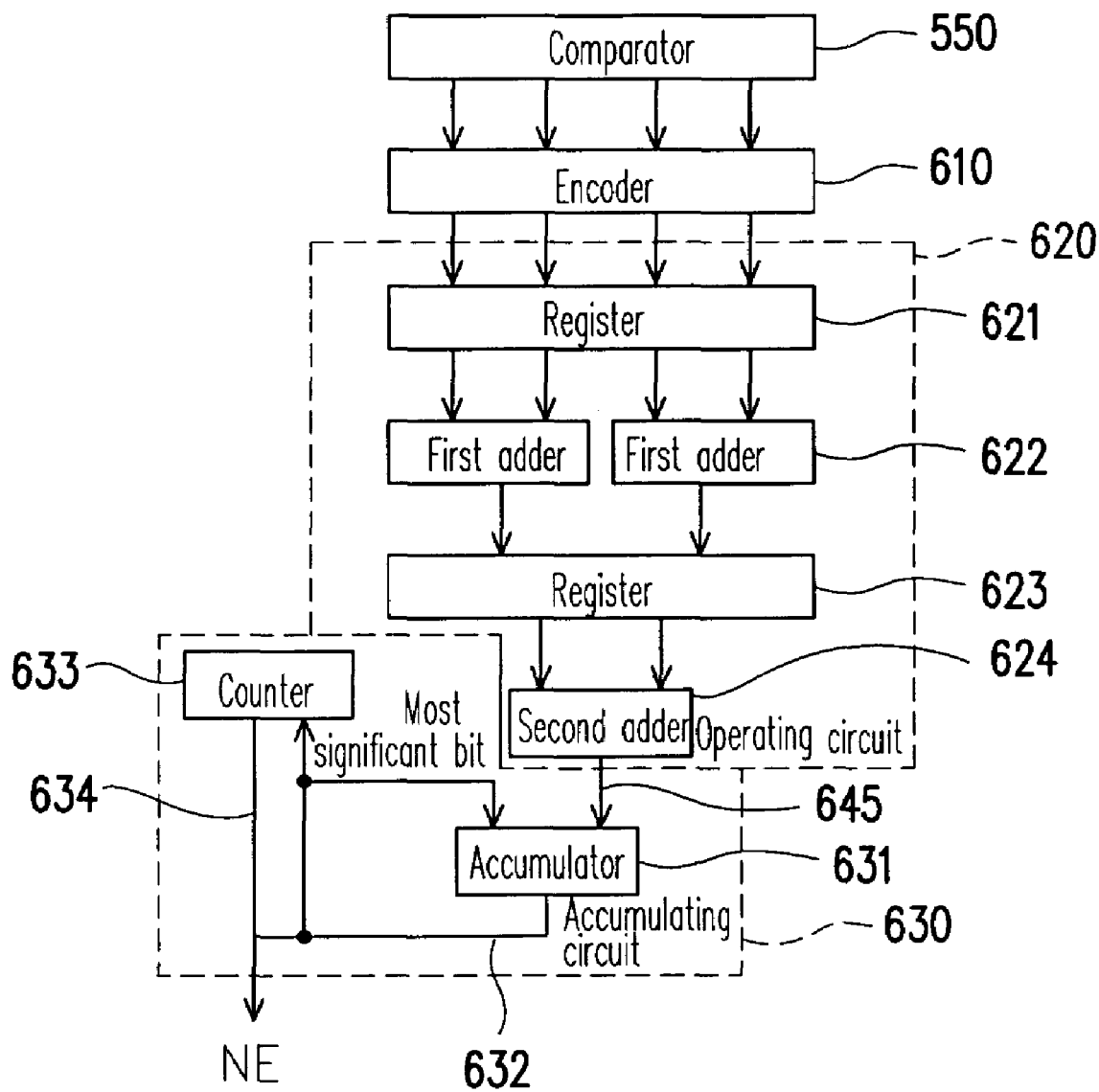
FIG. 6 schematically shows a block diagram of an error accumulator in the counting unit of FIG. 5.

FIG. 6 schematically shows a block diagram of an error accumulator in the counting unit 570. Referring to FIG. 6, wherein the output of the comparator 550 is N bits, in order to reduce the bit number of the adder and speed up the accumulating operation, the comparison result output by the comparator 550 is divided into multiple sets of bits. For better illustration, a case of N=16 and P=3 is exemplified hereinafter, and it is assumed that "1" in each bit of the comparison result indicates that an error is occurred in the bit corresponding to the code to be tested Din output from the object to be tested 510 in FIG. 5.

First, the comparison result of the comparator 550 is divided into 4 sets where each set has 4 bits. Then, each set of the bits in the comparison result is encoded and converted into a 3-bit value that represents the number of error occurrences by an encoder 610. For example, if one set is "1111" (which indicates errors are occurred in all 4 bits), the number of error occurrences generated by the encoder 610 after the encoding is "4" (i.e. "100" in binary numbers which indicates there are 4 error bits). A number of current errors 645 is subsequently output after the operating circuit 620 summates each time's number of errors with a pipeline method. In addition, a number of error bits is output after the accumulating circuit 630 accumulates each time's number of current errors 645.

The operating circuit 620 mentioned above comprises a register 621, a plurality of first adders 622, a register 623, and a second adder 624. Wherein, the encoder 610 outputs 4 sets of 3-bit number of error occurrences. After passing through the register 621, the 4 sets of 3-bit number of error occurrences are transmitted in pairs to the corresponding first adder 622 for performing the summation. Each of the first adders 622 summates the received 2 sets of 3-bit number of error occurrences and outputs a 4-bit medium error value respectively. The second adder 624 receives the 4-bit medium error value form the first adder 622 via the register 623, performs the summation, and outputs a 5-bit current error value 645.

The mentioned accumulating circuit 630 comprises an accumulator 631 and a counter 633. Wherein, the accumulator 631 accumulates a previous accumulation result 632 with the current error value 645, so as to output a current accumulation result 632. A most significant bit of the accumulation result 632 is further transmitted to the counter 633 so as to count the number of overflow in the accumulation result 632 and output a counting result 634. Wherein, the counting result 634 and the accumulation result 632 are the number of bit errors NE. Hence, an accumulator for counting the number of error occurrences with simplified hardware configuration and high efficiency is obtained.

Figure 7:
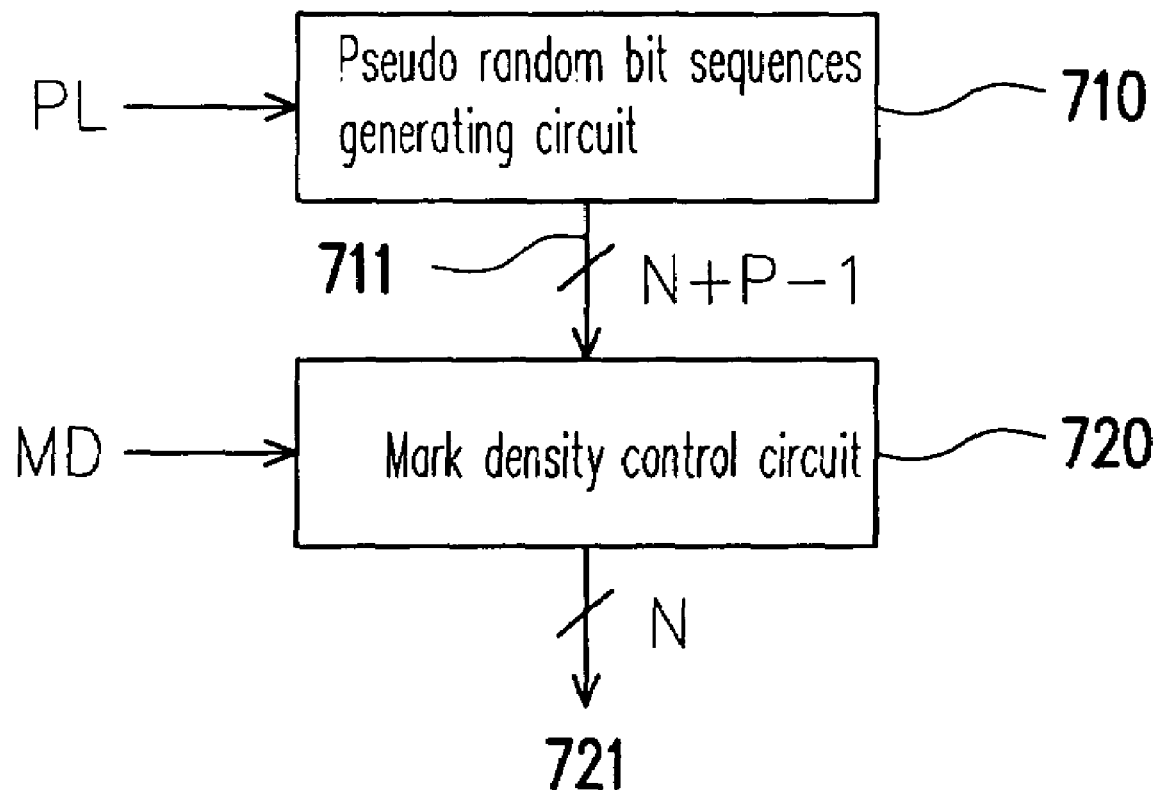
FIG. 7 schematically shows a block diagram of a parallel pseudo random bit sequences generator according to the preferred embodiment of the present invention.

The parallel pseudo random bit sequences generators 520, 530, and 540 having multiple pattern lengths and multiple mark densities according to the described embodiment may be implemented by referring to FIG. 7. FIG. 7 schematically shows a block diagram of a parallel pseudo random bit sequences generator according to the preferred embodiment of the present invention. Referring to FIG. 7, an (N+P−1)-bit original pseudo random bit sequences 711 having a maximum pattern length of $2^M-1$ is generated by the pseudo random bit sequences generator 710 based on a pattern length selection signal PL, wherein M and P are integers greater than 1. The mark density control circuit 720 receives the source pseudo random bit sequences 711, modifies the mark density of the source pseudo random bit sequences 711 based on a mark density selection signal MD, and outputs an N-bit pseudo random bit sequences 721 having a minimum mark density of $½^P$.

Figure 2:
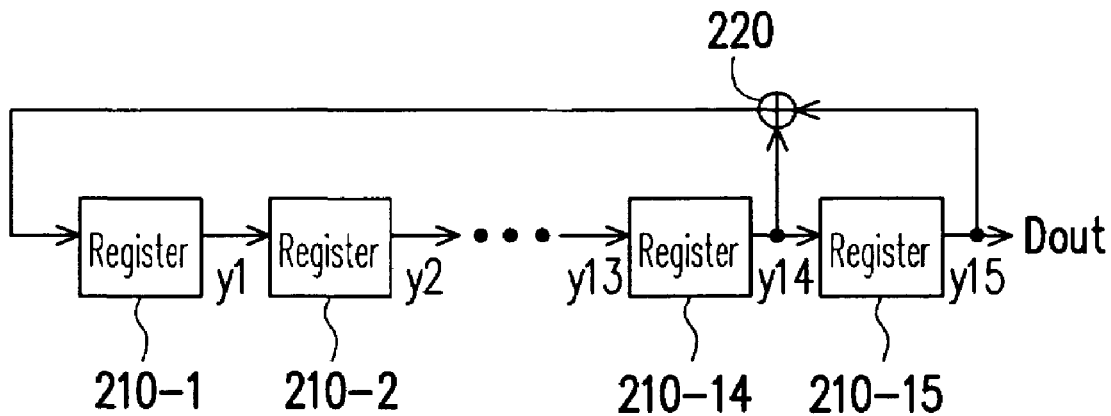
FIG. 2 schematically shows a conventional serial pseudo random bit sequences generator.
Figure 3:
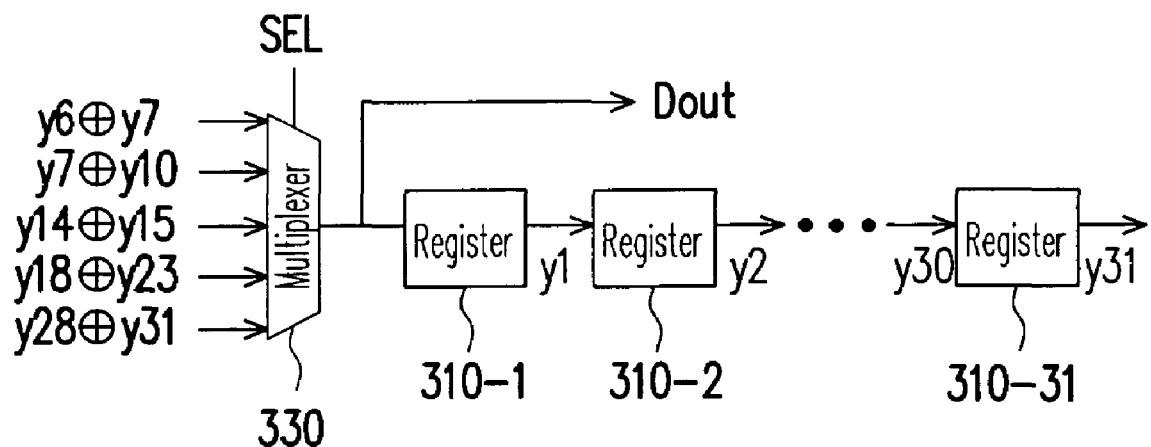
FIG. 3 schematically shows a conventional programmable serial pseudo random bit sequences generator configuration.
Figure 8A:
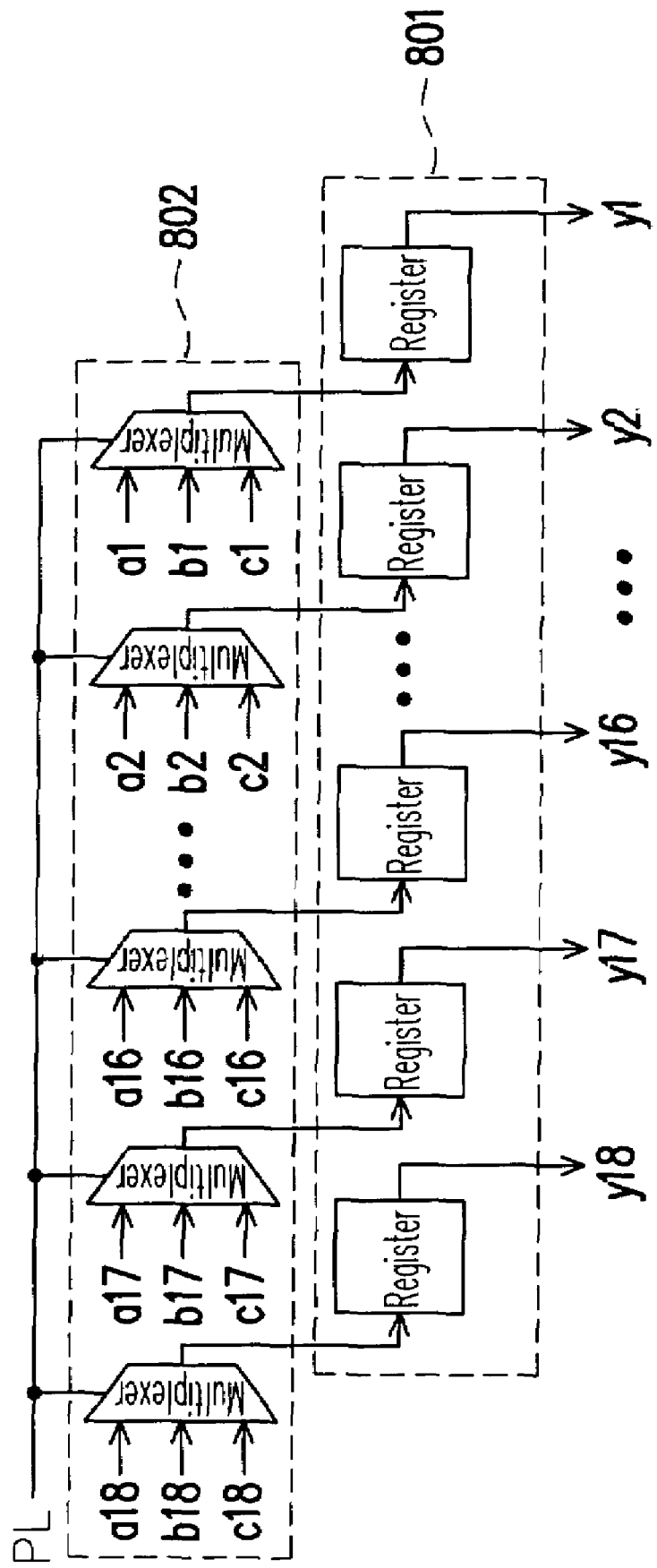
FIG. 8A schematically shows a block diagram of an embodiment of the pseudo random bit sequences generator in FIG. 7 where M is less than the number of the parallel output bits.

FIG. 2 mentioned above shows an example of a conventional pseudo random bit sequences generator with a fixed calculation length, its algorithm is represented by $y_m = y_{m-M} \oplus y_{m-M+a}$, and the pattern length is $2^M-1$, where a is an integer less than M. FIG. 8A schematically shows a block diagram of an embodiment of the pseudo random bit sequences generator 710 in FIG. 7, where M is less than the number of the parallel output bits. Referring to FIG. 8A, where a18~a1, b18~b1, and c18~c1 represent the outputs of the operating circuit when performing different algorithms, respectively. Wherein, each operating circuit uses an XOR gate to perform $y_m = y_{m-M} \oplus y_{m-M+a}$ operation, and pre-counts all parallel output data for next clock. In addition, a feedback bit is selected by the multiplexer 802 based on the pattern length selection signal PL in order to program the output pattern.

Figure 9A:
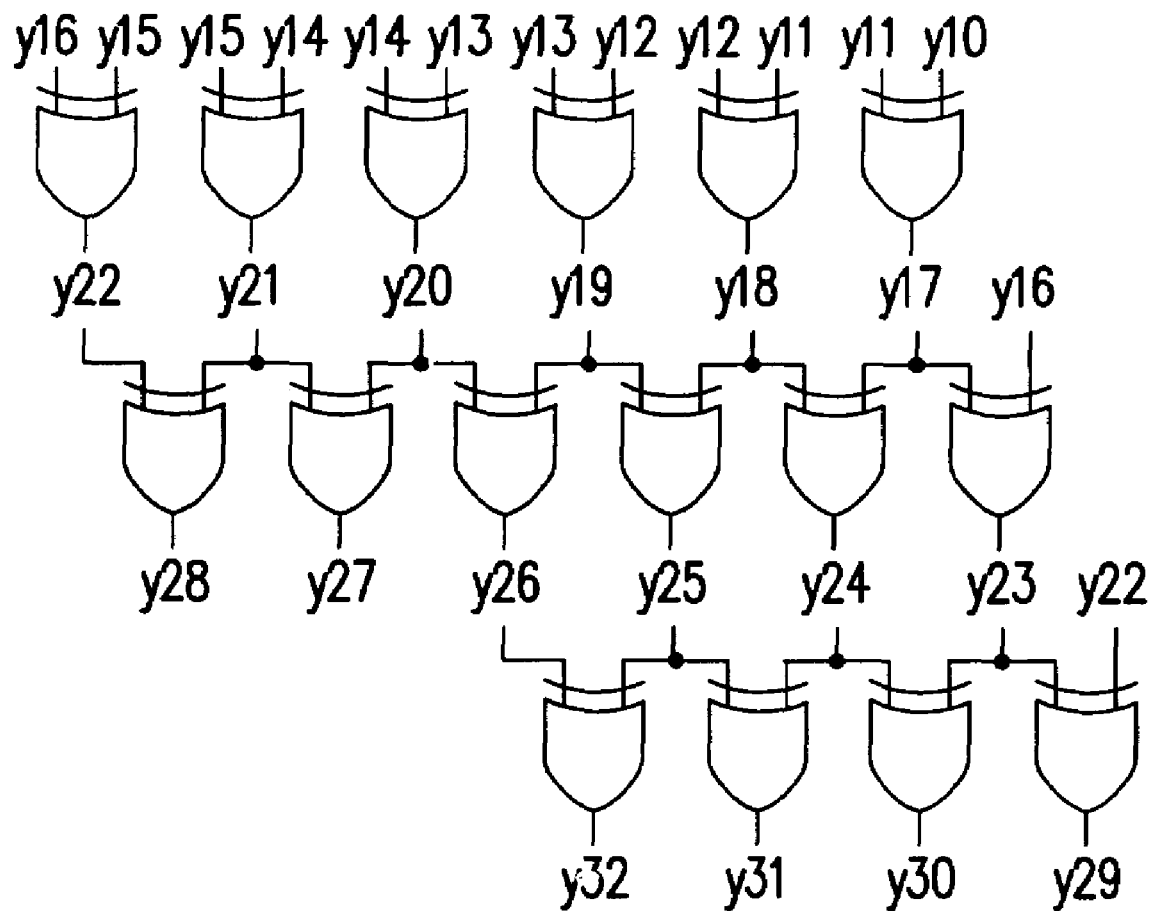
FIG. 9A schematically shows a pre-counting circuit which performs algorithm $Y_x = Y_{x-7} \oplus Y_{x-6}$ and has an output of 16 bits.

When the exponential M of the pattern length is less than or equal to the number of parallel output bits N, since the number of bits for parallel calculation is insufficient, it is not possible to generate all required output bits in such a short period of time. To solve this problem, a recursive pre-counting operation technique is applied herein to simplify the complexity of logic operation, so as to improve the operation speed of the entire generator. A pseudo random bit sequences having a pattern length of $2^M-1$ is exemplified hereinafter for description. Wherein, its $m^{th}$ bit is $y_m = y_{m-M} \oplus y_{m-M+a}$, and a is an integer less than M (a is used to represent different pattern lengths). For example, the input bits a18~a1 in FIG. 8A are the output bits $y_{32}$~$y_{17}$ of the operating circuit which performs $y_m = y_{m-7} \oplus y_{m-6}$ operation as shown in FIG. 9A respectively. FIG. 9A schematically shows a pre-counting circuit which performs algorithm $y_m = y_{m-7} \oplus y_{m-6}$ (the pattern length is $2^7-1$) and has a 16-bit output. The input bits $y_{16}$~$y_{10}$ in FIG. 9A are provided by part of the output bits of the register 801 in FIG. 8A.

Figure 9B:
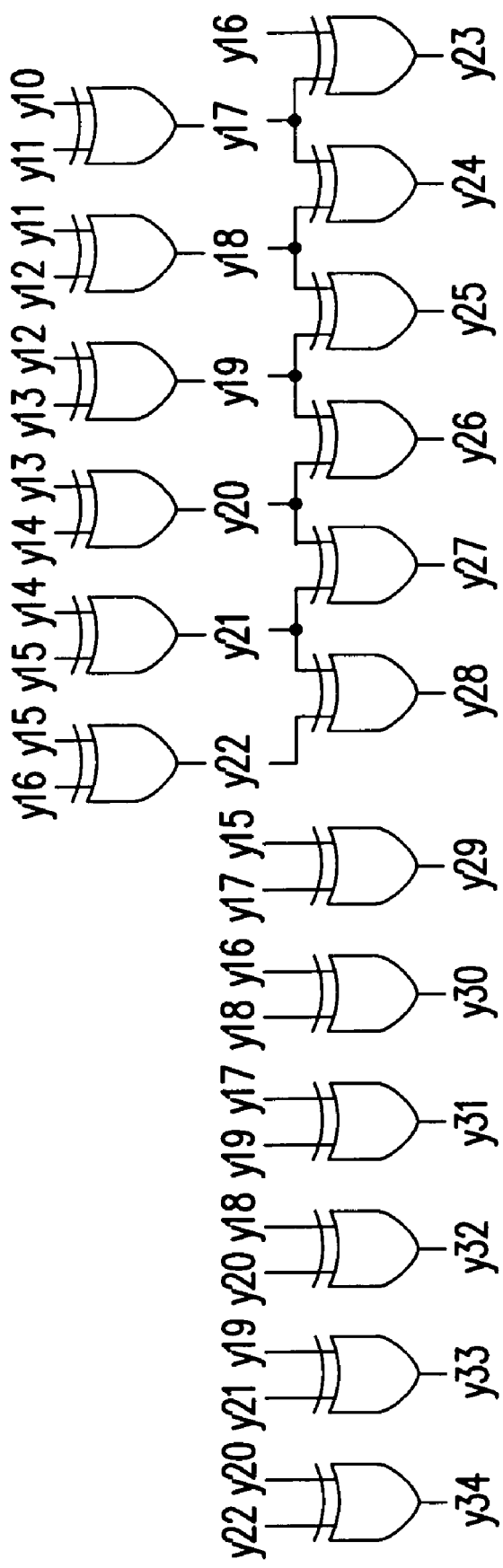
FIG. 9B schematically shows an operating circuit with a pattern length of $2^7 - 1$ simplified from the circuit in FIG. 9A.

After recursive simplification, $y_m = y_{m-M+a} \oplus y_{m-M+a}$ becomes:

$y_m = y_{m-2M} \oplus y_{m-2M+a} \oplus y_{m-2M+a} \oplus y_{m-2M+2a}$ $y_m = y_{m-2M} \oplus y_{m-2M+a}$ It is known from the equations above that the output result of $y_{m-M}$ and $y_m$ can be obtained based on $[y_{m-2M}, \ldots, y_{m-M-1}]$ pattern with the recursive pre-counting method. Therefore, more values can be pre-counted within the same XOR delay time. For example, FIG. 9B schematically shows an operating circuit simplified from the circuit in FIG. 9A having a pattern length of $2^7-1$. As shown in the diagram, a faster operation speed is obtained by applying the recursive pre-counting algorithm on the short pattern length. In addition, more data can be obtained by simplifying the logic operation and the pre-counting value is obtained within a shorter period of time, such that the speed for generating the pseudo random bit sequences is improved. Although FIGS. 9A and 9B are used as the embodiment for describing the pre-counting circuit which performs algorithm $y_m = y_{m-7} \oplus y_{m-6}$ in the present embodiment, it will be apparent to one of the ordinary skill in the art that different pre-counting circuits may be designed based on different algorithm it requires.

FIG. 8A schematically shows a parallel pseudo random bit sequences generating circuit of a pseudo random bit sequences generator where M is less than the number of parallel output bits. Besides outputting the 16-bit pseudo random bit sequences $y_{16}$~$y_1$, the extended bits $y_{18}$~$y_{17}$ are further included in each time's output, such that the mark density control circuit can perform the multiple mark density control function. Accordingly, the signal of the pattern generator is more versatile and the circuit is able to perform more complicated analysis.

Figure 8B:
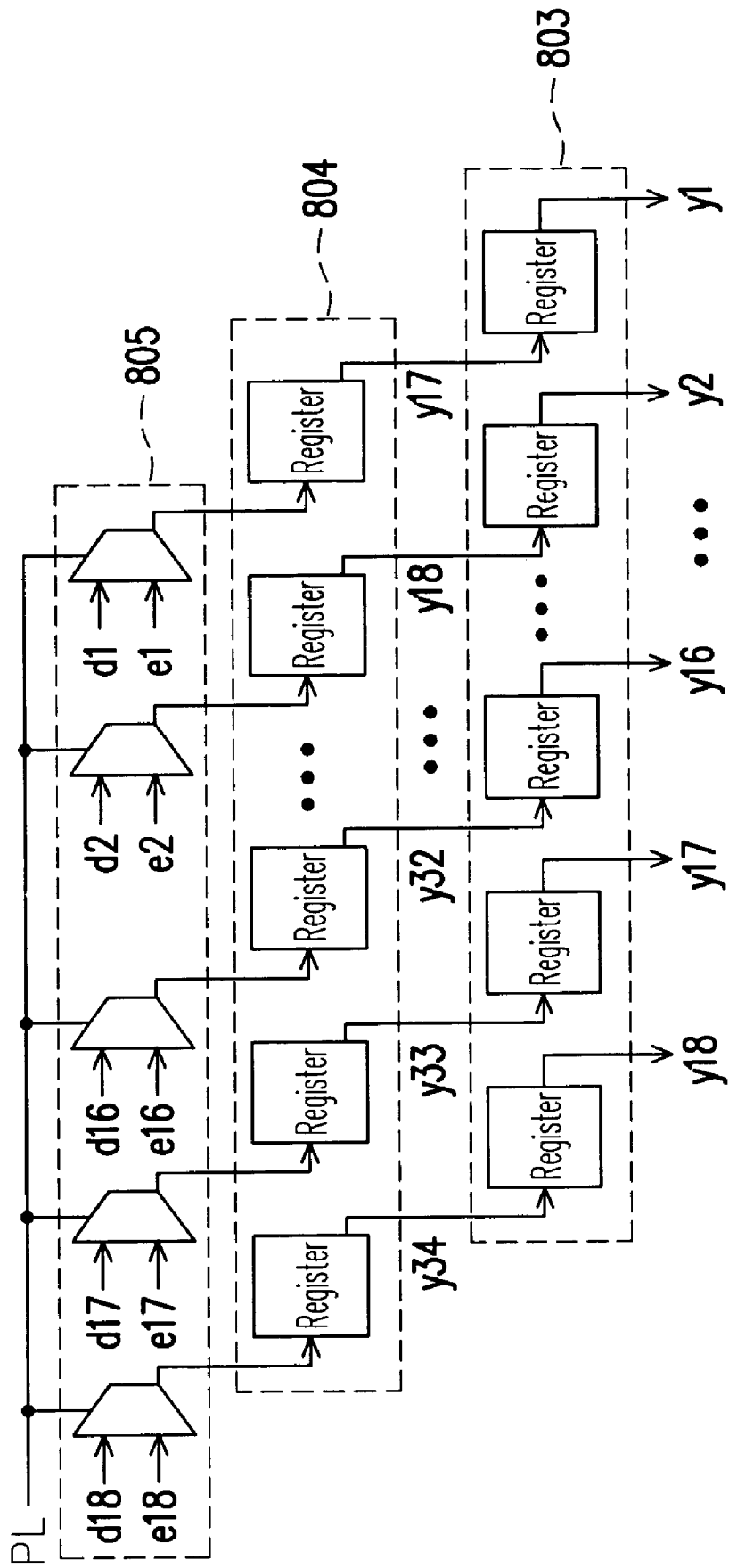
FIG. 8B schematically shows a block diagram of another embodiment of the pseudo random bit sequences generator in FIG. 7.

FIG. 8B schematically shows a pseudo random bit sequences generating circuit where M is greater than the parallel output bits and less than or equal to two times of the parallel output bits. As shown in FIG. 8B, the extended data obtained from performing the XOR pre-counting operation on the parallel pseudo random bit sequences is first temporarily stored in the register, and then outputs in parallel in the next clock. Wherein, d16~d1 and e16~e1 represent the outputs of the pseudo random bit sequences pre-counting circuits for two different sets of pattern lengths, and the pattern length is selected via a multiplexer 805. In other words, since the pre-counting circuit can only calculate the third record of data (i.e. d18~d1 or e18~e1, which is generated by the pre-counting circuit and selected by the multiplexer based on the pattern length selection signal PL) from the first record of data (i.e. $y_{18}$~$y_1$, which is output by a register 803), the second record of data needs to be first temporarily stored in a register 804 (i.e. $y_{34}$~$y_{17}$ output by the register 804), and then outputs from the register 803 after delaying for a certain period of time.

Figure 8C:
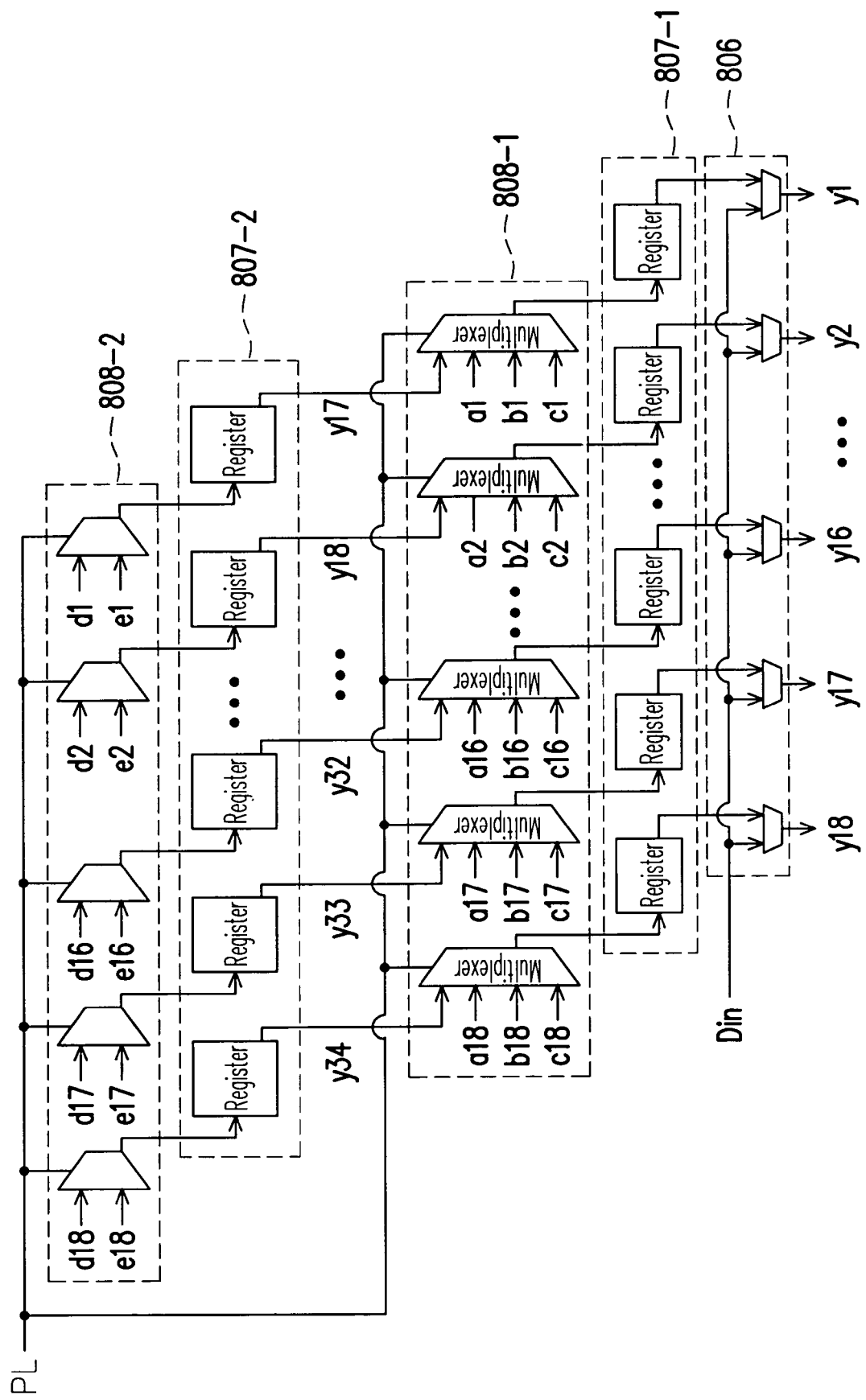
FIG. 8C schematically shows a block diagram of yet another embodiment of the pseudo random bit sequences generator in FIG. 7.

FIG. 8C schematically shows a block diagram of yet another embodiment of the pseudo random bit sequences generating circuit in FIG. 7. Referring to FIG. 8C, a 16-bit parallel output pseudo random bit sequences generating circuit having a pattern length of $2^7-1$, $2^{10}-1$, $2^{15}-1$, $2^{23}-1$, and $2^{31}-1$ is shown, wherein the pattern length output by the circuit is determined based on the pattern length selection signal PL. The output bits $y_{16}$~$y_1$ are output by the pseudo random bit sequences, and the additional added two-bit register is for storing the extended bits ($y_{34}$, $y_{33}$) and ($y_{18}$, $y_{17}$), such that the mark density control circuit 720 can generate the test signals having mark density of ½, ¼, and ⅛. In FIG. 8C, where d16~d1 and e16~e1 represent the outputs of the pseudo random bit sequences pre-counting circuits for two different sets of the pattern lengths where M is greater than the parallel output bits N and less than or equal to two times of the parallel output bits N. And the pre-counting circuits are, for example, to perform $y_m = y_{m-23} \oplus y_{m-18}$ and $y_m = y_{m-31} \oplus y_{m-28}$ operations, respectively. In addition, a16~a1, b16~b1, and c16~c1 in the diagram represent the outputs of the pseudo random bit sequences pre-counting circuits for three different sets of the pattern lengths where the exponential of the pattern length M is less than or equal to the parallel output bits, and the pre-counting circuits are, for example, the pre-counting circuits that perform $y_m = y_{m-7} \oplus y_{m-6}$, $y_m = y_{m-10} \oplus y_{m-7}$, and $y_m = y_{m-15} \oplus y_{m-14}$ operations, respectively. Wherein, the pattern length is selected via a first stage multiplexer 808-1 and a second stage multiplexer 808-2. For example, if it is intended to select the pre-counting circuit that performs $y_m = y_{m-23} \oplus y_{m-18}$ operation, with the control from the pattern length selection signal PL, the second stage multiplexer 808-2 selectively couples the input terminals d16~d1 to a second stage register 807-2, and the first stage multiplexer 808-1 selectively couples the output terminals of the second stage register 807-2 to a first stage register 807-1. In addition, for example, if it is intended to select the pre-counting circuit that performs $y_m = y_{m-7} \oplus y_{ni-6}$ operation, with the control from the pattern length selection signal PL, the first stage multiplexer 808-1 selectively couples the input terminals a16~a1 to the first stage register 807-1.

Figure 10A:
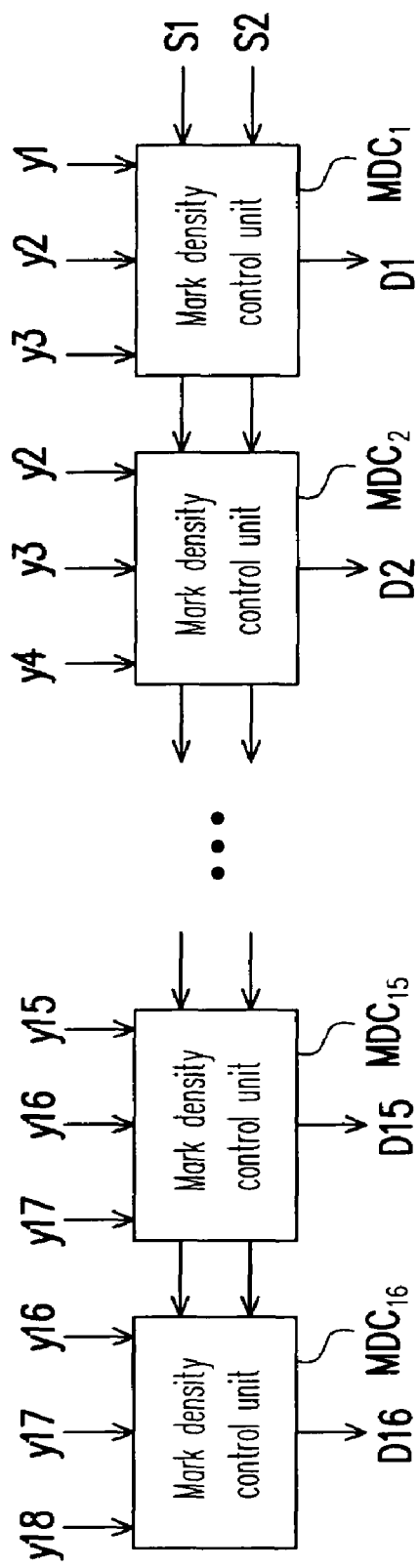
FIG. 10A schematically shows a block diagram of a mark density control circuit in FIG. 7.

The major purpose of the multiplexer 806 is to provide a function of loading an external signal Din into the pseudo random bit sequences generating circuit, like the case where the master pseudo random bit sequences generating circuit 530 receives the code to be tested Din output from the object to be tested 510 as shown in FIG. 5. The output terminals $y_{18} \sim y_1$ of the multiplexer 806 are sequentially coupled to the mark density control circuit 720 (as shown in FIG. 10A), so as to generate the pseudo random bit sequences having different mark density based on the control signal MD (e.g. S1 and S2 in FIG. 10A).

Figure 8D:
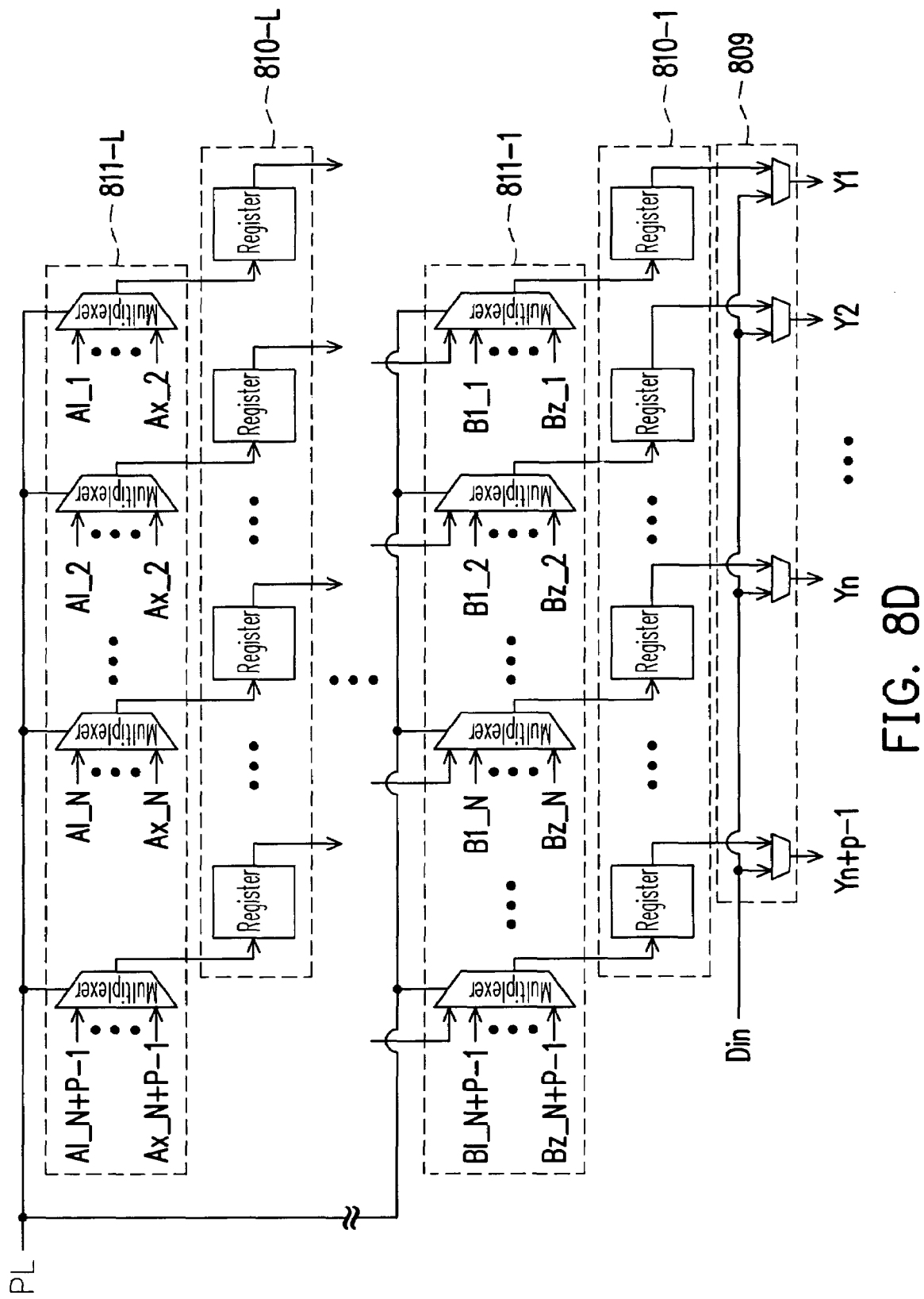
FIG. 8D schematically shows a block diagram of still yet another embodiment of the pseudo random bit sequences generator in FIG. 7.

FIG. 8D schematically shows a block diagram of still yet another embodiment of the pseudo random bit sequences generating circuit in FIG. 7. Referring to FIG. 8D, a pseudo random bit sequences generator which has an N-bit parallel output, a maximum pattern length of $2^M - 1$, and a minimum mark density of $\frac{1}{2^P}$ is shown. The pseudo random bit sequences generator comprises L stages of (N+P+1)-bit registers 810-1~810-L, where $$L = \left\lceil \frac{M}{N} \right\rceil.$$

Since the pseudo random bit sequences generating circuit has a steady state of all zeros, at least one of the register values has to be set as 1 in the circuit initialization state to ensure the circuit can be under normal operation. The initial values of all registers are set as 1 in the present embodiment.

Each stage of multiplexers 811-1~811-L selectively outputs a pre-counting result having a different pattern length from a different pre-counting circuit, and feeds the pre-counting result back to one stage of the corresponding registers 810-1~810-L. The pseudo random bit sequences is sequentially transmitted through each stage's register, and the pseudo random bit sequences is finally transmitted to the multiplexer 809 in parallel by the first stage register 810-1. The major purpose of the multiplexer 809 is to provide a function of loading the external signal Din into the pseudo random bit sequences generating circuit, like the case where the master pseudo random bit sequences generating circuit 530 receives the code to be tested Din from the object to be tested 510 as shown in FIG. 5. Besides transmitting to each pre-counting circuit, the output bits $y_{n+p-1} \sim y_1$ of the multiplexer 809 are sequentially coupled to the mark density control circuit 720 (as shown in FIG. 10A), so as to generate an N-bit pseudo random bit sequences having a maximum pattern length of $2^M - 1$ bits and a minimum mark density of $\frac{1}{2^P}$ based on control signal MD.

In addition, in terms of mark density control, since the neighboring bits of the pseudo random bit sequences are independent with each other, and the probabilities for 1 and 0 to occur are all equal to $\frac{1}{2}$, after performing a logic AND operation on the neighboring n bits, the probability of 1 to occur is reduced to $\frac{1}{2^n}$. Accordingly, the mark density of the pseudo random bit sequences bits is controlled by changing the number of the logic AND operations performed on the output bits, such that the equivalent DC level of the test signal is further modified. FIG. 10A schematically shows a block diagram of a mark density control circuit 720 in FIG. 7. Referring to both FIG. 7 and FIG. 10A, a case of N=16 and P=3 is exemplified herein for describing the multiple mark density control circuit. The pseudo random bit sequences $y_{18} \sim y_1$ output by the pseudo random bit sequences generating circuit 710 are fed into the corresponding mark density control unit $MDC_{16} \sim MDC_1$, respectively. That is, the $n^{th}$ mark density control unit receives y, $y_{n+1}$, and $y_{n+2}$. For example, the first mark density control unit $MDC_1$ receives $y_1$, $y_2$, and $y_3$, and the $16^{th}$ mark density control unit $MDC_{16}$ receives $y_{16}$, $y_{17}$, and $y_{18}$. In addition, each mark density control unit outputs an N-bit pseudo random bit sequences 721 (e.g. $D_{16} \sim D_1$ in the present embodiment) having a corresponding mark density based on the control of the mark density selection signal MD (e.g. the density selection signals S1 and S2 in the present embodiment).

Figure 10B:
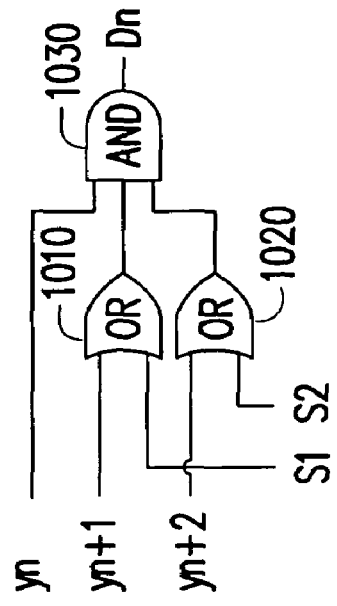
FIG. 10B schematically shows an embodiment of the mark density control unit in FIG. 10A.

FIG. 10B schematically shows an embodiment of the $n^{th}$ mark density control unit in FIG. 10A. Referring to both FIG. 10A and FIG. 101B, the OR gates 1010 and 1020 determine whether to transmit the pseudo random bit sequences bits $y_{n+1}$ and $y_{n+2}$ to an AND gate 1030 or not based on the density selection signals S1 and S2, respectively. The AND gate 1030 receives the pseudo random bit sequences bit $y_n$ and the outputs of the OR gates 1010 and 1020, so as to generate a pseudo random bit sequences bit $D_n$. Wherein, the operation is as shown in table 1 below.

TABLE 1

| S1 | S2 | $D_n$ | Mark Density |
|---|---|---|---|
| 0 | 0 | $y_n \cdot y_{n+1} \cdot y_{n+2}$ | $\frac{1}{8}$ |
| 0 | 1 | $y_n \cdot y_{n+1}$ | $\frac{1}{4}$ |
| 1 | 0 | $y_n \cdot y_{n+2}$ | $\frac{1}{4}$ |
| 1 | 1 | $y_n$ | $\frac{1}{2}$ |

Accordingly, by using the mark density control circuit 720 to change the mark density of the output pseudo random bit sequences, the pseudo random bit sequences generator of the present embodiment can simulate the DC level shift caused by different digital encoding, such that the test availability of the bit error rate tester is improved.

Although the invention has been described with reference to a particular embodiment thereof, it will be apparent to one of the ordinary skill in the art that modifications to the described embodiment may be made without departing from the spirit of the invention. Accordingly, the scope of the invention will be defined by the attached claims not by the above detailed description.

What is claimed is:

1. A bit error rate tester for counting a number of bit errors of an object to be tested, and the bit error rate tester comprising:

a transmitter pseudo random bit sequences generator for generating a parallel N-bit original pseudo random bit sequences, wherein N is an integer greater than 1 and the object to be tested outputs a parallel N-bit code to be tested after receiving the original pseudo random bit sequences;

a master pseudo random bit sequences generator for generating a parallel N-bit master pseudo random bit sequences;

a slave pseudo random bit sequences generator for generating a parallel N-bit slave pseudo random bit sequences;

a comparator for receiving, comparing, and determining whether the parallel N-bit code to be tested, the master pseudo random bit sequences, and the slave pseudo random bit sequences are the same or not, and outputting a comparison result; and a counting unit coupling to the comparator for counting the number of bit errors based on the comparison result;

wherein, each of the transmitter pseudo random bit sequences generator, the master pseudo random bit sequences generator, and the slave pseudo random bit sequences generator comprises:

a pseudo random bit sequences generating circuit for generating a parallel (N+P−1)-bit source pseudo random bit sequences having a maximum pattern length of $2^M-1$, where M and P are the integers greater than 1, comprising:

a plurality of pre-counting circuits, each of the pre-counting circuits is used to perform a logic operation based on one of a plurality algorithms and output one of a plurality of (N+P−1)-bit pre-counting results;

at least one multiplexer module, comprising (N+P−1) multiplexers, each of the (N+P−1) multiplexers outputs one bit of one of the (N+P−1)-bit pre-counting results based on a pattern length selection signal; and at least a register module, comprising (N+P−1) registers, each of the (N+P−1) registers temporarily storing an output of one of the (N+P−1) multiplexers based on a timing and outputs one bit of the parallel (N+P−1)-bit source pseudo random bit sequences;

wherein, each of the pre-counting circuits receives the parallel (N+P−1)-bit source pseudo random bit sequences and performs the logic operation on the parallel (N+P−1)-bit source pseudo random bit sequences based on the one of the algorithms, so as to output one of the pre-counting results, respectively; and a mark density control circuit for receiving the parallel (N+P−1)-bit source pseudo random bit sequences, and changing a mark density of the parallel (N+P−1)-bit source pseudo random bit sequences based on a mark density selection signal for outputting the parallel N-bit original pseudo random bit sequences, the parallel N-bit master pseudo random bit sequences, or the parallel N-bit slave pseudo random bit sequences respectively having a minimum mark density of $1/2^P$.

2. The bit error rate tester of claim 1, wherein the counting unit further counts a number of comparisons based on the comparison result, so as to obtain a bit error rate of the object to be tested from the number of comparisons and the number of bit errors.

3. The bit error rate tester of claim 1 wherein the object to be tested is a data transmission system.

4. The bit error rate tester of claim 1, wherein the slave pseudo random bit sequences generator receives the parallel N-bit code to be tested, and generates the parallel N-bit slave pseudo random bit sequences based on the current parallel N-bit code to be tested.

5. The bit error rate tester of claim 1, wherein except receiving the parallel N-bit code to be tested in order to generate the parallel N-bit master pseudo random bit sequences in a predetermined period, the master pseudo random bit sequences generator does not receive the code to be tested but automatically generates master pseudo random bit sequences.

6. The bit error rate tester of claim 1, wherein the counting unit comprises:

an encoder for receiving the comparison result from the comparator, encoding the number of error bits for current comparison to a plurality of numbers of error occurrences based on the comparison result, and outputting the numbers of error occurrences;

an operating circuit for receiving and summating the numbers of error occurrences, and outputting a number of current errors; and an accumulating circuit for sequentially receiving and summating each time's number of current errors, and outputting the number of bit errors.

7. The bit error rate tester of claim 6, wherein the operating circuit comprises:

a plurality of first adders, wherein each of the first adders receives and summates two of the corresponding numbers of error occurrences, and outputs a medium number of errors, respectively; and a second adder for receiving and summating the medium numbers of errors, and outputting the number of current errors.

8. The bit error rate tester of claim 6, wherein the accumulating circuit comprises:

an accumulator for summating a previous accumulation result to the number of current errors, and outputting a current accumulation result; and a counter for counting a number of overflow for a most significant bit of the current accumulation result generated by the accumulator, and outputting a counting result, wherein a combination of the counting result and the accumulation result is the number of bit errors.

9. The bit error rate tester of claim 1, wherein if an $s^{th}$ stage multiplexer module among the multiplexer modules is represented by $MUX_s$, and an $s^{th}$ stage register module among the register modules is represented by $REG_s$, where s is an integer greater than 0 and less than or equal to $$\lceil \frac{M}{N} \rceil,$$

input terminals of $REG_s$ are coupled to output terminals of $MUX_s$ respectively, and output terminals of $REG_s$ are coupled to part of input terminals of $MUX_{s-1}$.

10. The bit error rate tester of claim 1, wherein one of the algorithms is $Y_x=Y_{x-7} \oplus Y_{x-6}$, where $Y_x$, represents an $x^{th}$ bit of the pseudo random bit sequences generated by the pseudo random bit sequences generating circuit, and x is an integer greater than 0.

11. The bit error rate tester of claim 1, wherein the mark density control circuit comprises:

N mark density controllers $MDC_n$ for parallely receiving a plurality of outputs $Z_n \sim Z_{n+P-1}$ from the pseudo random bit sequences generating circuit, and determining the mark density of the pseudo random bit sequences $D_n$ to be $1/2 \sim 1/2^P$ based on the control from the mark density selection signal and outputting $D_n$, where $Z_n$ represents an output of the $n^{th}$ bit from the pseudo random bit sequences generating circuit, $MDC_n$ represents the $n^{th}$ mark density controller, $D_n$ represents an output of the $n^{th}$ mark density controller, and n is an integer greater than 0 and less than or equal to N.

12. A pseudo random bit sequences generator, comprising:
a pseudo random bit sequences generating circuit for generating a parallel (N+P−1)-bit source pseudo random bit sequences having a maximum pattern length of $2^M-1$, where M and P are the integers greater than 1, comprising:
- a plurality of pre-counting circuits, each of the pre-counting circuits is used to perform a logic operation based on one of a plurality algorithms and output one of a plurality of (N+P−1)-bit pre-counting results;
- at least one multiplexer module, comprising (N+P−1) multiplexers, each of the (N+P−1) multiplexers outputs one bit of one of the (N+P−1)-bit pre-counting results based on a pattern length selection signal; and
- at least a register module, comprising (N+P−1) registers, each of the (N+P−1) registers temporarily storing an output of one of the (N+P−1) multiplexers based on a timing and outputs one bit of the parallel (N+P−1)-bit source pseudo random bit sequences;
- wherein, each of the pre-counting circuits receives the parallel (N+P−1)-bit source pseudo random bit sequences and performs the logic operation on the parallel (N+P−1)-bit source pseudo random bit sequences based on the one of the algorithms, so as to output one of the pre-counting results, respectively; and
- a mark density control circuit for receiving the parallel (N+P−1)-bit source pseudo random bit sequences, and changing a mark density of the parallel (N+P−1)-bit source pseudo random bit sequences based on a mark density selection signal for outputting a parallel N-bit pseudo random bit sequences having a minimum mark density of $1/2^P$.

13. The pseudo random bit sequence generator of claim 12, wherein if an $s^{th}$ stage multiplexer module among the multiplexer modules is represented by $MUX_s$, and an $s^{th}$ stage register module among the register modules is represented by $REG_s$, where s is an integer greater than 0 and less than or equal to $$\left\lceil \frac{M}{N} \right\rceil,$$

input terminals of $REG_s$ are coupled to output terminals of $MUX_s$ respectively, and output terminals of $REG_s$ are coupled to part of input terminals of $MUX_{s-1}$.

14. The pseudo random bit sequence generator of claim 12, wherein one of the algorithms is $Y_x=Y_{x-7} \oplus Y_{x-6}$, where $Y_x$ represents an $x^{th}$ bit of the pseudo random bit sequences generated by the pseudo random bit sequences generating circuit, and x is an integer greater than 0.

15. The pseudo random bit sequences generator of claim 12, wherein the mark density control circuit comprises:
- N mark density controllers $MDC_n$ for parallely receiving a plurality of outputs $Z_n \sim Z_{n+p-1}$ from the pseudo random bit sequences generating circuit, and determining the mark density of the pseudo random bit sequences $D_n$ to be $1/2 \sim 1/2^P$ based on the control from the mark density selection signal and outputting $D_n$, where $Z_n$ represents an output of the $n^{th}$ bit from the pseudo random bit sequences generating circuit, $MDC_n$ represents the $n^{th}$ mark density controller, $D_n$ represents an output of the $n^{th}$ mark density controller, and n is an integer greater than 0 and less than or equal to N.

* * * * *